United States Patent
Kenkare (10) Patent No.: US 8,711,874 B2
(45) Date of Patent: Apr. 29, 2014

(54) METHOD AND SYSTEM FOR AN INTEGRATED HOST PCI I/O BRIDGE AND DUAL PORT GIGABIT ETHERNET CONTROLLER

(75) Inventor: Sagar W. Kenkare, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/476,294

(22) Filed: May 21, 2012

(65) Prior Publication Data

US 2012/0233371 A1 Sep. 13, 2012

Related U.S. Application Data

(63) Continuation of application No. 10/887,067, filed on Jul. 8, 2004, now Pat. No. 8,249,097.

(60) Provisional application No. 60/486,943, filed on Jul. 14, 2003.

(51) Int. Cl.
*H04J 3/02* (2006.01)

(52) U.S. Cl.
USPC .......................................... 370/462; 370/463

(58) Field of Classification Search
USPC ................................................ 370/462, 463
See application file for complete search history.

(56) References Cited

U.S. PATENT DOCUMENTS

| | | |
|---|---|---|
| 5,978,858 A | 11/1999 | Bonola et al. |
| 6,122,667 A * | 9/2000 | Chung .......................... 709/228 |
| 6,697,254 B1 | 2/2004 | King et al. |
| 2002/0059424 A1 | 5/2002 | Ferguson et al. |
| 2003/0055900 A1 | 3/2003 | Glas et al. |
| 2003/0093607 A1 | 5/2003 | Main et al. |
| 2003/0105830 A1 | 6/2003 | Pham et al. |
| 2003/0202510 A1 | 10/2003 | Witkowski et al. |

OTHER PUBLICATIONS

Lucent Technologies (Dual-Gigabit Ethernet Over SONET/SDH, Nov. 2000).

* cited by examiner

*Primary Examiner* — Sai-Ming Chan
(74) *Attorney, Agent, or Firm* — Oblon, Spivak, McClelland, Maier & Neustadt, L.L.P.

(57) ABSTRACT

Embodiments may include two gigabit Ethernet controllers integrated within a single chip and an I/O bridge coupled to the two gigabit Ethernet controllers and integrated within the single chip. The system may further include an I/O function coupled to the I/O bridge that is integrated within the single chip. The I/O function may include I/O logic and an I/O buffer integrated within the single chip and coupled to the I/O bridge and/or the two gigabit Ethernet controllers. A timing function or timing block may also be coupled to the I/O bridge and integrated within the single chip. A host system may be coupled to the I/O bridge. The I/O bridge may further include a primary bus controller, which may be a primary PCI bus controller. The controller or controller block may include control and status registers that may be coupled to the primary bus controller.

10 Claims, 8 Drawing Sheets

METHOD AND SYSTEM FOR AN INTEGRATED HOST PCI I/O BRIDGE AND DUAL PORT GIGABIT ETHERNET CONTROLLER

CROSS-REFERENCE TO RELATED APPLICATIONS/INCORPORATION BY REFERENCE

This application is a continuation of copending U.S. utility application entitled, "Method and System for an Integrated Host PCI I/O Bridge and Dual Port Gigabit Ethernet Controller," having Ser. No. 10/887,067, filed Jul. 8, 2004, which claims the benefit of U.S. provisional application having Ser. No. 60/486,943, filed Jul. 14, 2003.

The application also makes reference to U.S. patent application Ser. No. 10/887,123, filed Jul. 8, 2004, and U.S. patent application Ser. No. 10/887,515, filed Jul. 8, 2004.

The above stated applications are incorporated herein by reference in their entirety.

FIELD OF THE INVENTION

Certain embodiments of the invention relate generally to high speed networking hardware. More specifically, certain embodiments of the invention relate to a method and system for an integrated host PCI input/output (I/O) bridge and dual port gigabit Ethernet controller chip.

BACKGROUND OF THE INVENTION

High-speed digital communication networks over copper and optical fiber are used in many network communication and digital storage applications. Ethernet and Fiber Channel are two widely used communication protocols, which continue to evolve in response to increasing demands for higher bandwidth in digital communication systems.

The Ethernet protocol may provide collision detection and carrier sensing in the physical layer. The physical layer, layer 1, is responsible for handling all electrical, optical, opto-electrical and mechanical requirements for interfacing to the communication media. Notably, the physical layer may facilitate the transfer of electrical signals representing an information bitstream. The physical layer may also provide services such as, encoding, decoding, synchronization, clock data recovery, and transmission and reception of bit streams.

As the demand for higher data rates and bandwidth continues to increase, equipment vendors are continuously being forced to employ new design techniques for manufacturing network layer 1 equipment capable of handling these increased data rates. Chip real estate and printed circuit board (PCB) real estate is generally extremely expensive. Accordingly, the use of available chip and PCB real estate is therefore a critical fabrication consideration when designing chips and/or circuit boards. Particularly in high speed applications operating at high frequencies, a high device count and pin count may result in designs that are susceptible to interference. Notably, high device and pin counts may significantly increase chip real estate and accordingly, significantly increase implementation cost.

Furthermore, the integration of network equipment into different types of networks forces equipment vendors to design network equipment that is compatible with a plurality of network interfaces. For example, in order to be competitive, network servers are designed so that they can be flexibly integrated into a plurality of different networks. Compounded with the need to save on expensive real estate, equipment manufactures are demanding tighter chip integration of networking interfaces.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention include a method and system for providing an integrated networking interface. Aspects of the system may include at least two gigabit Ethernet controllers integrated that are within a single chip. An I/O bridge may also be coupled to the two gigabit Ethernet controllers and integrated within the single chip. The system may further include an I/O function that may be coupled to the I/O bridge and integrated within the single chip. The I/O function may include I/O logic and an I/O buffer which may be integrated within the single chip and coupled to the I/O bridge and/or the two gigabit Ethernet controllers. A host system may be coupled to the I/O bridge. A timing function or timing block may also be coupled to the I/O bridge and integrated within the single chip.

The I/O bridge may further include a primary bus controller, which may be a primary PCI bus controller. The controller or control block having at least one control and status register may also be coupled to the primary bus controller. The I/O bridge may further include a secondary bus controller that may be a secondary PCI bus controller. The I/O bridge interface which may be integrated within the I/O bridge may be coupled to the secondary bus controller. The I/O bridge may also include an inter-module bus interface, which may be coupled to the primary bus controller and/or a secondary bus controller.

Another embodiment of the invention may include a method for providing an integrated networking interface. Aspects of the method may include controlling transfer of data across an inter-module bus interface of an I/O bridge and simultaneously managing the inter-module bus interface via at least a first bus controller integrated within the I/O bridge in a single chip. An Ethernet interface integrated within said I/O bridge may also be simultaneously managed via at least a second bus controller integrated within the chip. At least one other bus interface, which may be a PCI bus interface, may be managed via the first bus controller. At least a first Ethernet network connection and a second Ethernet network connection may be independently processed via the Ethernet interface. The first bus controller integrated within the I/O bridge may be a primary bus controller such as a primary PCI bus controller. The second bus controller integrated within the I/O bridge may be a secondary bus controller such as a secondary PCI bus controller.

These and other advantages, aspects and novel features of the present invention, as well as details of a illustrated embodiment thereof, will be more fully understood from the following description and drawings.

DETAILED DESCRIPTION OF THE INVENTION

Aspects of the invention provide a method and system for an integrated host PCI input/output (I/O) bridge and dual port gigabit Ethernet controller. The integrated host PCI I/O bridge with dual port gigabit Ethernet controllers includes an I/O bridge integrated with two integrated gigabit Ethernet (GbE) adapters, each capable of full-duplex operation at speeds up to one Gigabit/second, for example, along with a PCI-X bus controller. The tight integration of these features improves system performance and reduces system cost. The integrated host PCI I/O bridge eliminates the need for discrete GbE interfaces, reduces system board real estate requirements, and facilitates the use of the GbE in, for example, space-constrained server blade applications. The integration of high-performance communications applications directly into core logic reduces system costs, increases bandwidth and establishes gigabit Ethernet as a standard primary connection in all servers.

The integrated gigabit Ethernet controllers on the integrated host PCI I/O bridge with dual port gigabit Ethernet controllers may also include a full range of features that may be configured to optimize system performance and manageability. For example, each Ethernet media access control (MAC) unit includes two high-speed processor cores or an on-chip processor that may be utilized for advanced packet filtering and CPU off-loading. The integrated host PCI I/O bridge may also include two (2) integrated Ethernet physical access layer interfaces (PHY) that operate with standard twisted pair wiring at speeds of 10, 100 or 1000 Megabits/second. Another embodiment of the integrated IOB may also be adapted to support differential signaling to an external SERDES interface for optical and backplane applications, for example.

Figure 1:
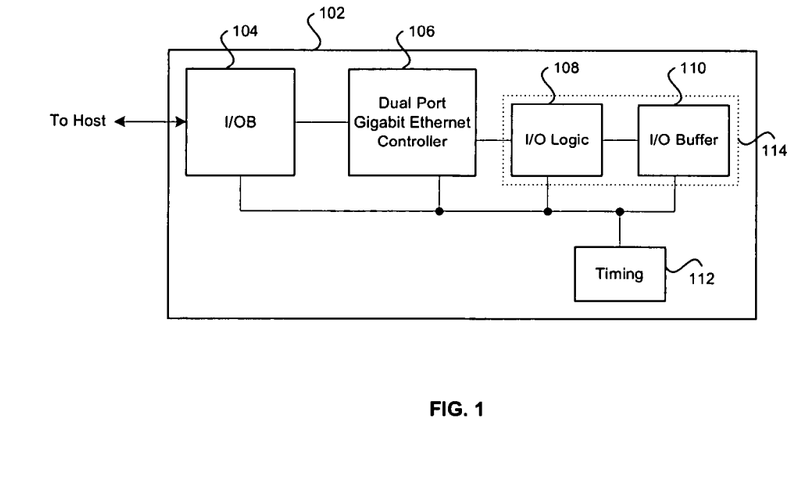
FIG. 1 is a block diagram of an exemplary integrated host PCI I/O bridge (I/OB or IOB) and dual port gigabit Ethernet controller in accordance with an embodiment of the invention.

FIG. 1 is a block diagram of an exemplary integrated host PCI I/O bridge (I/OB or IOB) and dual port gigabit Ethernet controller in accordance with an embodiment of the invention. Referring to FIG. 1, the integrated host PCI I/O bridge and dual port gigabit Ethernet controller 102 may include an I/O bridge 104, a dual port gigabit Ethernet controller 106, an I/O logic block 108, an I/O buffer block 110 and a timing block 112. The I/O logic block 108 and the I/O buffer block 110 may be integrated into a single functional I/O block 114.

The I/O logic block 108 may include suitable logic, circuitry and/or code that may be adapted to control the I/O buffer block 110, the dual port gigabit Ethernet controller 106 and the I/O bridge block 104.

The I/O buffer block 110 may include suitable buffers that may be utilized for buffering data for the I/O bridge 104 and the dual port gigabit Ethernet controller 106.

The timing block 112 may include suitable logic and/or circuitry that may generate one or more clock signals that may be utilized by the I/O bridge 104, the dual port gigabit Ethernet controller 106, the I/O logic block 108 and the I/O buffer block 110. Accordingly, the timing block 112 may include, for example, at least one clock generator and a phase lock loop (PLL).

The I/O bridge 104 may include one or more interfaces that may couple the integrated host PCI I/O bridge and dual port gigabit Ethernet controller 102 to at least one host system.

Figure 2A:
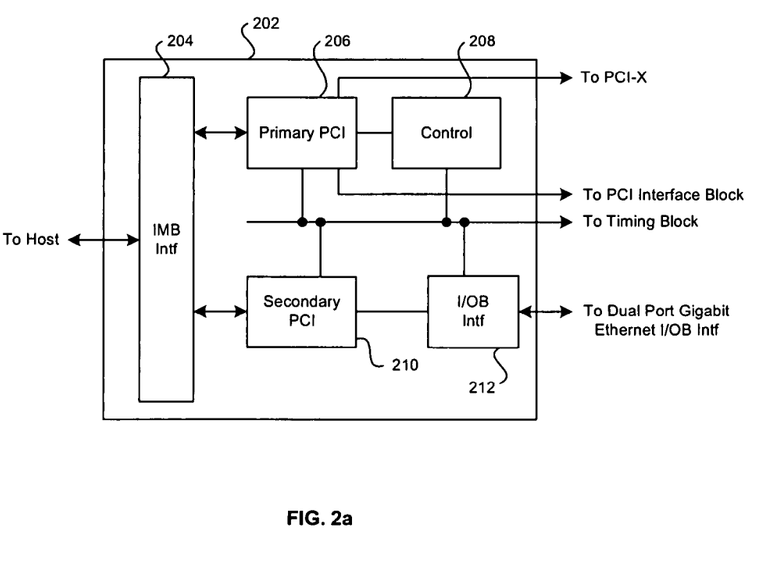
FIG. 2a is a block diagram of an I/O bridge in accordance with an embodiment of the invention.

FIG. 2a is a block diagram of an I/O bridge 202 in accordance with an embodiment of the invention. Referring to FIG. 2a, the I/O bridge may include an inter-module bus interface 204, a primary PCI controller 206, a secondary PCI controller 210, a control block 208 and an I/O bridge interface 212. The primary PCI controller 206, the secondary PCI controller 210, the control block 208 and the I/O bridge interface 212 be coupled to the timing block 112 of the integrated host PCI I/O bridge and dual port gigabit Ethernet controller 102.

The inter-module bus (IMB) interface 204 may include suitable logic and circuitry coupled to at least one connector. The inter-module bus interface 204 may be coupled to the primary PCI controller 206 and the secondary PCI controller 210. One or more control and status registers in the control block 208 may be utilized for controlling and/or providing status on the operation of the inter-module interface 204.

The primary PCI controller 206 may be coupled to the inter-module bus interface 204, the dual port gigabit Ethernet controller 106 and the I/O logic block 108. The primary PCI controller 206 may be configured to facilitate the transfer of information from the intermodule bus interface 204 to the PCI or PCI-X bus. In general, the primary PCI controller 206 may be adapted to control bus operation and functionality.

The secondary PCI controller 210 may be coupled to the inter-module bus interface 204 and the I/O bridge interface 212. The secondary PCI controller 210 may be configured to facilitate the transfer of information from the intermodule bus interface 204 to the I/O bridge interface 212. This may permit the I/O bridge 204 to communicate with the dual port Ethernet controller 302 via their respective I/O bridge interfaces 212 and 318 respectively. In general, the secondary PCI controller 210 may be adapted to control Ethernet operations and functionality.

The control block 208 may include a plurality of control registers and/or status registers. The control and status resisters in the control block 208 may be memory mapped I/O registers. The control registers in the control block 208 may be utilized to configure and control the I/O bridge 104, the dual port gigabit Ethernet controller 106 and the I/O logic block 108, for example. The status registers in the control block 208 may include one or more bits and/or registers that may provide status information pertaining to a static and/or operational state of the I/O bridge 202.

The I/O bridge interface 212 may include suitable logic and/or circuitry that may be utilized to interface the I/OB 202 with the integrated dual port gigabit Ethernet controller 106. The I/O bridge interface 212 may be coupled to the I/O bridge interface 318 (FIG. 3) of the dual port gigabit Ethernet controller 302.

In FIG. 2a, the dual port gigabit Ethernet controller 106 may include two (2) IEEE 802.3 compliant media access controllers (MACs) with two 10/100/1000 Ethernet transceivers or PHYs, a shared PCI or PCI-X bus interface, an on-chip buffer memory that may be suited particularly for high density server applications, for example. The dual port gigabit Ethernet controller may perform all physical layer functions for 1000 BASE-T, 100 BASE-T and 10 BASE-T on standard Category 5 Unshielded Twisted Pair (UTP) cable, for example. The two full featured MAGs may provide full and half duplex modes at various operating speeds. The dual port gigabit Ethernet controller may include a single PCI v2.2/PCI-X v1.0 bus interface, although the chip functions as if there are two logical software interfaces. Interrupts may be handled by interrupt interfaces within the PCI interface. Each MAC controller may be adapted to have its own PCI configuration space, which may be individually managed via an internal MII control block. Individual MAC on-chip memory may provide packet buffering for increased performance and load balancing. Each MAC function may include dual transmit and receive on-chip processors which may be configured to execute custom frame or packet processing features.

At least two powerful DMA engines may be configured to maximize system bus throughput and minimize CPU overhead. At least two on-chip buffer memories are provided to further enhanced system performance. Although state machine logic may be provided for at least some controller operations, two RISC processors are provided for each PCI function. The two RISC processors or CPUs may be utilized to greatly enhance the state machine logic. These CPUs may provide advanced filtering and traffic classification as well as support for computation intensive TCP/IP operations. A firmware solution, for example, may also be provided for a full ASF feature set via a SMBUS interface.

Figure 2B:
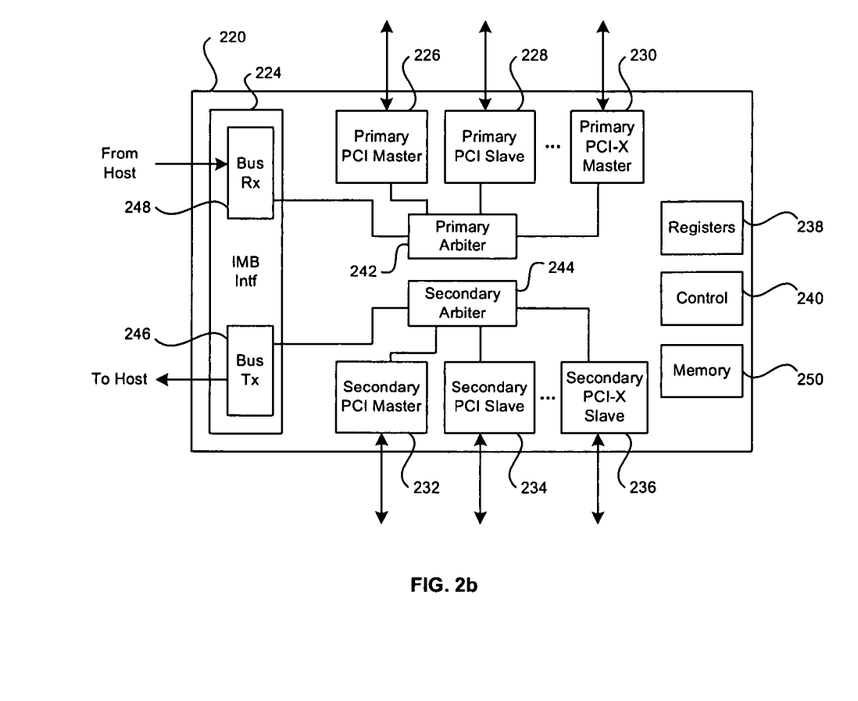
FIG. 2b is a more detailed block diagram of an I/O bridge in accordance with an embodiment of the invention.

FIG. 2b is a more detailed block diagram of an exemplary I/O bridge 220 in accordance with an embodiment of the invention. Referring to FIG. 2b, there is shown an I/O bridge 220 comprising an intermodule bus (IMB) block 224, a primary PCI master interface block 226, a primary PCI slave interface block 228, a primary PCI-X master interface block 230, a secondary PCI master interface block 232, a secondary PCI slave interface block 234, and a secondary PCI-X slave interface block 236. The I/O bridge 220 also comprises a primary arbiter 242, a secondary arbiter 244, a register block 238, a control block 240 and a memory block 250.

The primary arbiter 242 may be adapted to arbitrate access to resources such as bus and memory access for the primary bus interfaces 226, 228 and 230. The secondary arbiter 244 may be adapted to arbitrate access to resources such as bus and memory access for the secondary bus interfaces 232, 234 and 236. The bus arbiters 242, 244 may be adapted to support a plurality of PCI and/or PCI-X compliant devices on each of the primary and secondary bus. Accordingly, the invention is not limited to the three (3) primary bus interfaces 226, 228, 230 and the three (3) secondary bus interfaces 232, 234, 236 that are illustrated in FIG. 2b.

The intermodule bus (IMB) block 224 comprises a bus transmitter interface block 246 and a bus receiver interface block 248. Although the bus transmitter interface block 246 and a bus receiver interface block 248 are separately illustrated, the invention is not limited in this regard. Accordingly, the bus transmitter interface block 246 and a bus receiver interface block 248 may also be integrated into a single transceiver interface.

The register blocks 238 and 239 may comprise a plurality of control and status registers and associated circuitry, which may be utilized to control and/or provide various status of the I/O bridge 220.

The control block 240 may comprise suitable logic, circuitry and/or code that may be utilized to control the operations and/or functions of the I/O bridge 220. Notwithstanding, the control block may comprise, a bus decoder, PCI to IMB conversion block, for example.

The memory block 250 may comprise a plurality of memory block. For example, the memory 250 may comprise one or more write data buffers, write address buffers, address buffers, read data buffers, request address buffers.

Figure 3:
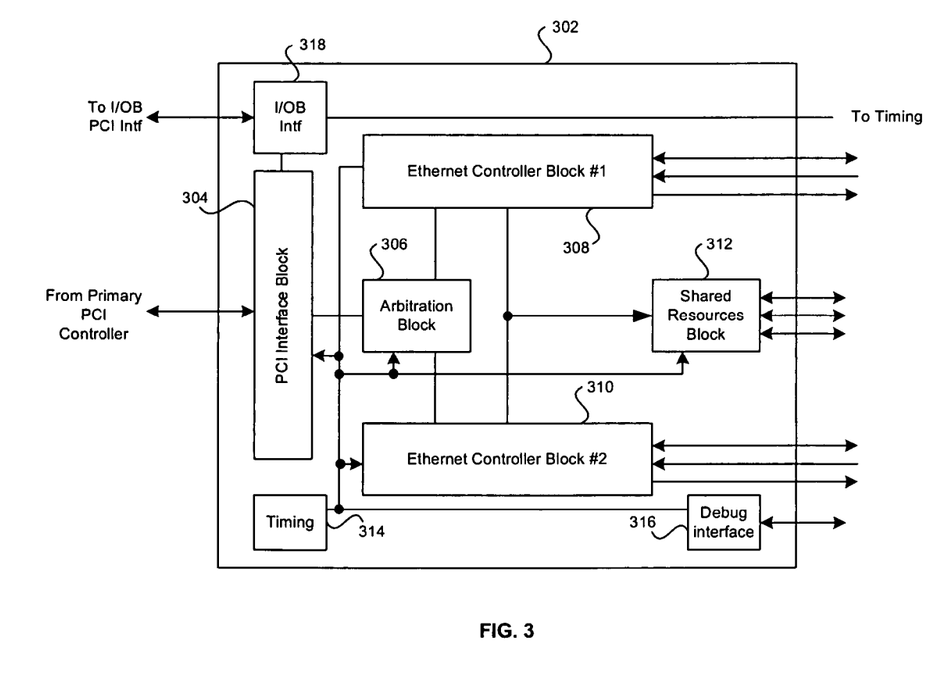
FIG. 3 is a block diagram of a dual port gigabit Ethernet controller in accordance with an embodiment of the invention.

FIG. 3 is a block diagram of a dual port gigabit Ethernet controller in accordance with an embodiment of the invention. Referring to FIG. 3, the dual port gigabit Ethernet controller may include a PCI/PCI-X bus interface block 304, an arbitration block 306, a first Ethernet controller block 308, a second Ethernet controller block 310, a shared resources block 312, a timing block 314 and a debug interface block 316. The bus interface block 304, the arbitration block 306, the first and second Ethernet controller blocks 308, 310, the shared resources block 312, the timing block 314 and the debug interface block 316 may all be integrated with the I/O bridge 104 (FIG. 1) into a single package.

The PCI block 304 may be a PCI or PCI-X bus interface block. The bus interface block 304 may be coupled to the arbitration block 306. The PCI/PCI-X interface block which is backward compatible, may also be compliant with legacy PCI generations or versions. Accordingly, the PCI block 304 may support high bandwidth technologies such as gigabit Ethernet, gigabit fiber channel and other broadband wired and/or wireless technologies, for example.

The arbitration block 306 may be any arbiter, which may include suitable logic and/or software that may be adapted to arbitrate resource access by the first gigabit Ethernet controller block 108 and the second gigabit Ethernet controller block 310. In this regard, the arbiter 306 may control access to the shared resources block 312 and the bus interface block 304. The arbitration block 306 may provide an arbitration function that may be adapted to control dataflow between two independent Ethernet controller functions. Each of the independent gigabit Ethernet controller functions corresponds to one of the gigabit Ethernet controller blocks 308, 310. The arbiter 306 may be configured to control dataflow between two independent PCI/PCI-X functions handled by the PCI interface block 304. A first PCI function may correspond with the first gigabit Ethernet controller block 308 and a second PCI function may correspond with the second gigabit Ethernet controller block 310.

Figure 4:
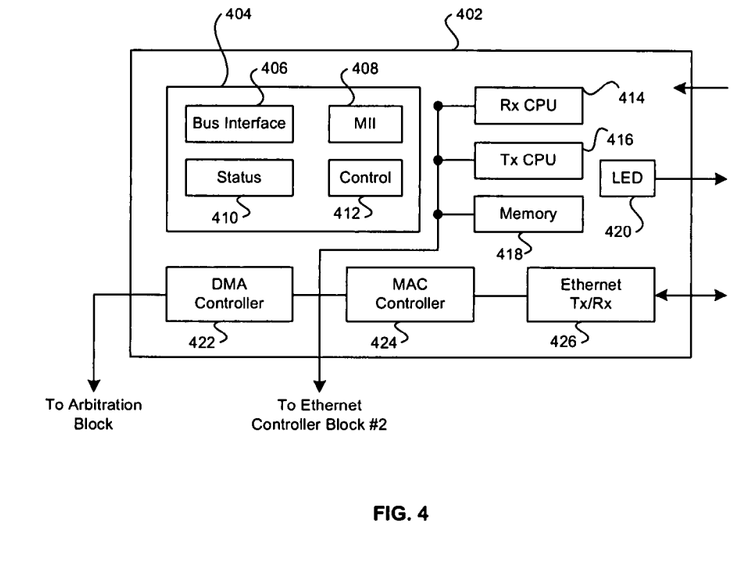
FIG. 4 is a block diagram of an exemplary Ethernet controller block as illustrated in FIG. 3 in accordance with an embodiment of the invention.

The first Ethernet controller block 308 may be identical to the second Ethernet controller block 310. FIG. 4 is a block diagram of an exemplary Ethernet controller block as illustrated in FIG. 3 in accordance with an embodiment of the invention. Referring to FIG. 4, there is shown a register interface block 404, a receiver central processing unit (Rx CPU) 414, a transmitter central processing unit (Tx CPU) 416, a memory block 418, a LED block 420, a DMA controller 422, a MAC controller 424 and an Ethernet transceiver (Tx/Rx) 426. The register control block 404 may include a plurality of registers that may be utilized for control and/or to provide status information. The register control block 404 may include a bus interface register block 406, a management interface II (MII) register block 408, a status register block 410, and a control register block 412.

The PCI/PCI-X bus interface register block 406 may include suitable logic and/or registers that may be adapted to provide status on various operating aspects of the bus interface block 304. Additionally, the PCI/PCI-X bus interface register block 406 may also be configured to control the operation of the bus interface block 304. The bus interface register block 406 may be a PCI/PCI-X register block. Accordingly, the PCI/PCI-X register block 406 may be read to provide a status of the PCI/PCI-X interface. Additionally, one or more bit locations in the PCI register block 406 may be set or cleared to control the operation of the PCI/PCI-X interface 404 of FIG. 1.

The management interface II (MII) block 408 may include suitable logic and/or registers that may be adapted to implement the standardized MII protocol. For example, the MII block 408 may include suitable circuitry for controlling standardized MDC and MDIO interface signals. The MII interface may be adapted to provide status on the Ethernet transceiver 426.

The status register block 410 may include suitable logic and/or software that may be adapted to provide status on any of the components of the integrated dual port gigabit Ethernet controller. In this regard, the status register block 410 may provide status on any one or more of the bus interface block 304, the arbitration block 306, the first and second Ethernet controller blocks 308, 310, the shared resources block 312, the timing block 314 and/or the debug interface block 316.

The control register block 412 may include suitable logic and/or software that may be adapted to control the operation of any of the components of the integrated dual port gigabit Ethernet controller chip. In this regard, the control register block 412 may provide status on any one or more of the bus interface block 304, the arbitration block 306, the first and second Ethernet controller blocks 308, 310, the shared resources block 312, the timing block 314 and/or the debug interface block 316 of FIG. 3.

Figure 5A:
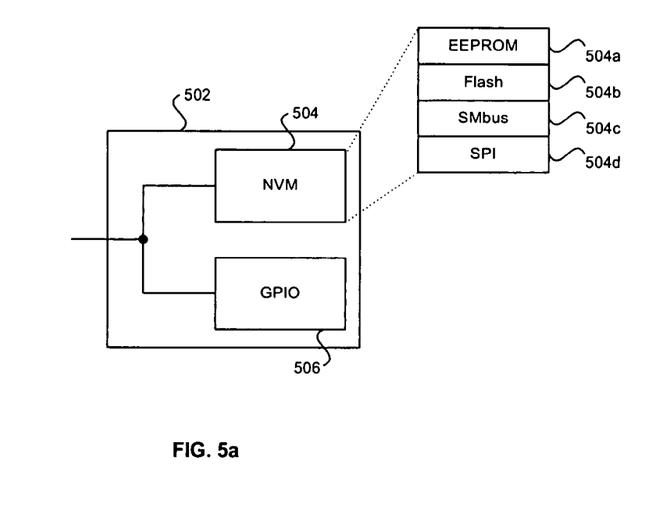
FIG. 5a is a block diagram of the shared resources block of the integrated dual port gigabit Ethernet controller chip in accordance with an embodiment of the invention.

FIG. 5a is a block diagram of the shared resources block of the integrated dual port gigabit Ethernet controller chip in accordance with an embodiment of the invention. Referring to FIG. 5a, the shared resources block 502 may include a non-volatile memory (NVM) block 504 and a general purpose input/output (GPIO) interface block 306. The NVM block 504 may include any one or more of an EEPROM block 504a, a flash block 504b, a SMbus block 504c and a serial programming interface (SPI) block 504d. The NVM block 504 may include one or more semaphore registers that may be adapted to provide access to the NVM block 504 by a plurality of on-chip devices. The NVM block 504 may be controlled through, for example, the status register block 510 and the control register block 512

The EEPROM block 504a may be adapted to store device configuration information. The device configuration information may include but is not limited to, a MAC address for both MACs, a PCI device ID, vital product data (VPD), data, a boot code image and power up boot code.

The flash block 504b may be adapted to store boot code, which may be utilized during initialization of the integrated dual port gigabit Ethernet controller chip. The SMbus block 504c may include the necessary logic, including registers and timers, and software that may be adapted to provide alert specification forum (ASF) functionality.

The serial programming interface (SPI) block 504d may be adapted to provide a serial connection to a serial device such as an EEPROM or a Flash device. The SPI interface block 504d may be controlled through the status register block 410 and the status of the SPI interface block 504d may be determined by reading the control register block 412.

The general purpose input/output (GPIO) interface block 506 may include a plurality of GPOI pins that may be controlled and monitored through the bus interface or PCI register 406. Each MAC controller may include registers that may be configured to share the GPIO pins in the input/output (GPIO) interface block 506. A contention resolution prevention scheme may be implemented to prevent dual access to the GPIO pins.

Figure 5B:
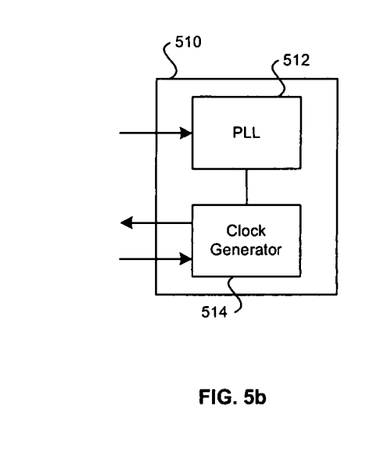
FIG. 5b is a block diagram of the timing block of the integrated dual port gigabit Ethernet controller chip in accordance with an embodiment of the invention.

In FIG. 3, the timing block 314 may be adapted to provide clock timing and reset signals for the integrated dual port gigabit Ethernet controller chip. FIG. 5b is a block diagram of the timing block of the integrated dual port gigabit Ethernet controller chip in accordance with an embodiment of the invention. Referring to FIG. 5b, there is shown a phase lock loop (PLL) block 512 and a clock generator block 514. The PLL block 512 and the clock generator block 514 may be configured to generate clocks having rates such as 25 MHz, 66 MHz, 125, MHz and 166 MHz, for example. The generated clocks may be supplied to the bus interface block 304, the arbitration block 306, the first and second Ethernet controller blocks 308, 310, the shared resources block 312, the timing block 314 and/or the debug interface block 316. The generated clocks may be utilized for device initialization and for resetting one or more internal or external devices.

The debug interface block 316 may be any suitable debug interface. For example, the debug interface block 316 may be a JTAG block. In this regard, the JTAG block may include pertinent logic and/or software that may be adapted to process JTAG signals such as TCK, TMS, TDI and TDO. The JTAG block may be compliant with the standardized JTAG debug interface.

Referring to FIG. 4, each of the Ethernet controller blocks 308, 310 of FIG. 3, may include a receiver central processing unit (Rx CPU) 414 and a transmitter central processing unit (Tx CPU) 416. The receiver central processing unit 414 may be a RISC processor or other suitable processor, which may be adapted to process channel information. For example, the receiver central processing unit 414 may process information for the MAC controller 424. In one aspect of the invention, the receiver central processing 414 and the transmitter central processing unit 416 may be adapted to run at a clock speed of about 133 MHz and may be adapted to process 32-bit wide data, for example. Either one of the receiver central processing unit 414 or the transmitter central processing unit 416 may be configured to operate as a boot processor for the integrated dual port gigabit Ethernet controller chip. In this regard, the boot processor may contain a ROM, which may be adapted to store bootstrap code. The receiver central processing unit (Rx CPU) 414 and the transmitter central processing unit (Tx CPU) 416 may also be referred to as on-chip processors.

Each of the receiver central processing unit 414 or the transmitter central processing unit 416 may include a scratch-pad memory, an instruction cache and a data cache. The receiver central processing unit 414 or the transmitter central processing unit 416 may include master/slave interfaces to the integrated dual port gigabit Ethernet controller chip. At least one semaphore register may be configured to permit the Tx CPU 416 and the Rx CPU 414 to share the same hardware resources.

The memory block 418 may include at least one or more of each of the following memory blocks: register block, memory window block, configuration memory block, Rx-CPU scratch pad block, Tx-CPU scratch pad block, Rx-CPU ROM block, Tx-CPU ROM block, mailbox memory block, DMA descriptor block, send ring data block, standard receive and send ring memory block, jumbo receive or send ring memory block, a buffer block, unmapped memory space blocks, reserved memory blocks, and page memory blocks. The various regions of the memory block 418 may be memory mapped.

Accordingly, a host processor's memory space may be memory mapped to the memory space of the integrated dual port gigabit Ethernet controller chip. In certain instances, a host processor may be adapted to address various portions of the memory block 418, such as the register block, without windowing. The integrated dual port gigabit Ethernet controller chip may include a base address register (BAR) from which all the components of the memory block 418 may be accessed as an offset to the BAR.

The LED block 420, may be a LED interface which may include a LED control register and one or more LEDs. The LED block 420 may be configurable via the LED control register and may permit the LED block 420 to function in various operational modes. In general, the LED modes may be adapted to permit the LEDs to be driven from either the MAC controller 424 and the LED control register or from the Ethernet transceiver 426. The Ethernet transceiver 426 may also include one or more LED modes that may be utilized to drive the one or more of the LEDs in the LED block 420.

The DMA controller 422 may be any suitable DMA controller that may be adapted to facilitate the access and transfer of information to and from the devices such as the first Ethernet controller block 308, the second Ethernet controller block 310, the arbitration block 306, the bus interface block 304 and the shared resources block 312 illustrated in FIG. 3.

Figure 6:
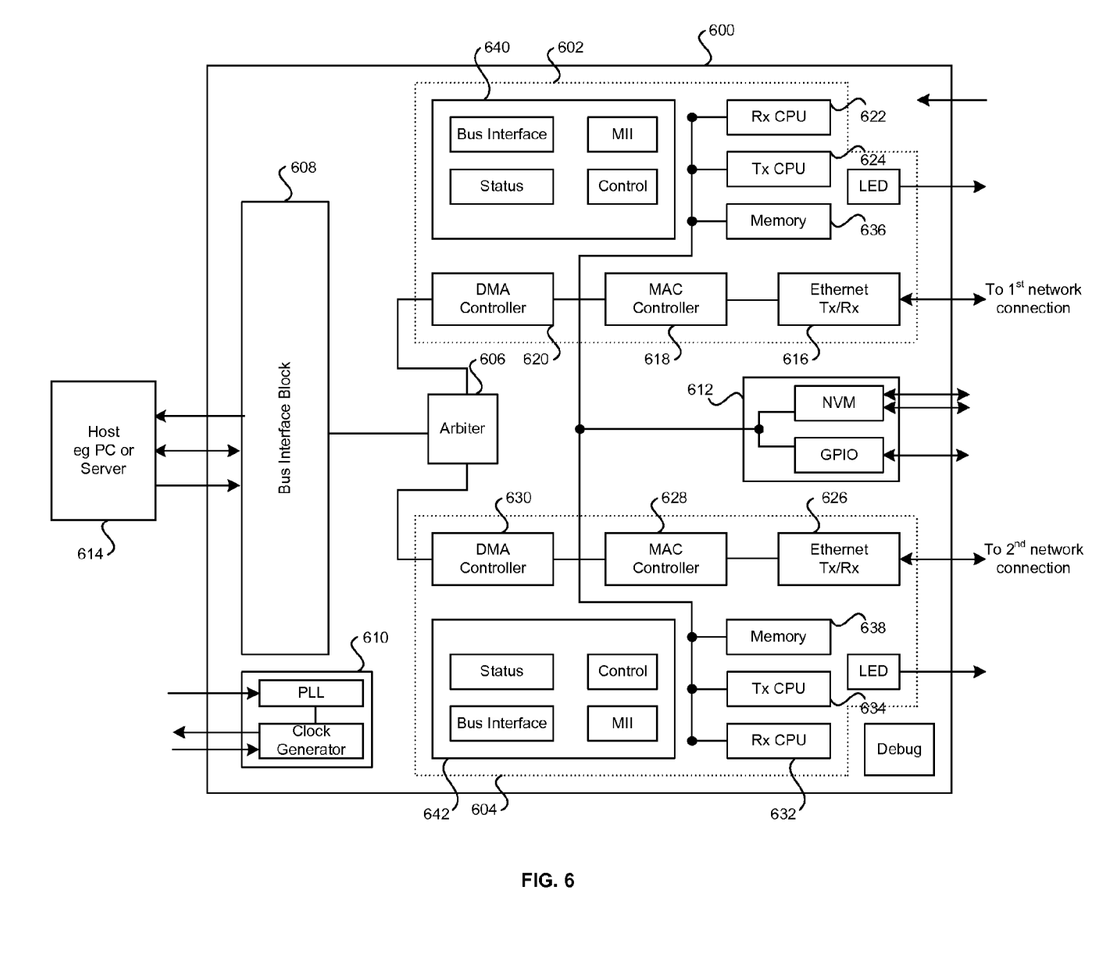
FIG. 6 is a block diagram of an integrated dual port gigabit Ethernet controller chip in accordance with an embodiment of the invention.

FIG. 6 is a block diagram of an integrated dual port gigabit Ethernet controller chip in accordance with an embodiment of the invention. Referring to FIG. 6, there is shown an integrated dual port gigabit Ethernet controller chip 600 coupled to a host system 614. FIG. 6 also illustrates a first Ethernet controller 602, a second Ethernet controller 604, an arbiter 606, shared resources including an NVM and a GPIO collectively referenced as 612 and a timing block including a PLL and a clock generator collectively referenced as 610. The first Ethernet transceiver block or PHY 616 of the first transceiver 602 may be coupled to a first network connection and the second Ethernet transceiver block or PHY 604 may be coupled to a second network connection.

The first Ethernet controller 602 may include an RxCPU 522, a TxCPU 624, a memory 636, an Ethernet transceiver or PHY 616, a MAC controller 618, and a DMA controller 620. The second Ethernet controller 604 may include an RxCPU 632, a TxCPU 634, a memory 638, an Ethernet transceiver or PHY 626, a MAC controller 628, and a DMA controller 630.

The host system or host may be a personal computer (PC). The integrated dual port gigabit Ethernet controller 600 may be integrated within a PC card or it may be integrated within a motherboard of the host 614 in a case where the host is a PC. The bus interface block 608 may be adapted to couple the integrated dual port gigabit Ethernet controller 600 to the host system 614. In one aspect of the invention, the bus interface block 608 may be a PCI interface that may allow the integrated dual port gigabit Ethernet controller chip 600 to communicate through a PCI bus of the host system 614.

In 10BASE-T mode, Manchester encoding may be performed on a data stream and transmitted on one pair in a twisted pair cable. A multimode transmit DAC may perform pre-equalization for about 100 meters of CAT 3 cable, for example. In 100BASE-TX mode, the integrated dual port gigabit Ethernet controller chip may transmit a continuous data stream on one pair in the twisted pair cable, and receive a continuous data stream on another pair of conductors. The MAC may provide nibble-wide or 4-bit data which may be encoded into 5-bit code-groups and inserted into the transmit data stream. The transmit packet may be encapsulated by replacing the first two preamble nibbles with a start of stream delimiter (SSD) or /J/K codes and appending an end of stream delimiter or /T/R codes to the end of the packet. When the MAC indicates a transmit error, the transmit error code-group (/H) may be sent in place of the corresponding data code-group. The transmitter may repeatedly send the idle code-group between packets. The encoded data stream may be serialized and then scrambled by, for example, a stream cipher block. The scrambled data may then be encoded into MLT3 signal levels.

In 1000BASE-T mode, the integrated dual port gigabit Ethernet controller chip may simultaneously transmit and receive a continuous data stream on all four twisted pairs on the CAT 5 cable on the active port. When a packet is pending transmission from the MAC, byte-wide data from the MAC may be scrambled, trellis encoded into a 4-dimensional code-group, for example, a PAM5 symbol on each of the four twisted pairs, and inserted into the transmit data stream. The transmit packet may be encapsulated by replacing the first two bytes of preamble with a start-of-stream delimiter and appending an end-of-stream delimiter to the end of the packet. When the MAC indicates a transmit error during a packet, a transmit error code-group may be sent in place of the corresponding data code-group. The transmitter may send idle code-groups or carrier extend code-groups between packets. The MAC may use carrier extension to separate packets within a multiple-packet burst. Carrier extend error may be indicated by replacing the transmit data input with a suitable code such as 0x1F during carrier extension.

In 10BASE-T mode, Manchester decoding may be performed on the data stream. Accordingly, a received data stream, following equalization and clock recovery, may be converted from MLT3 to serial NRZ data. The stream cipher block may descramble the NRZ data. The descrambled data may then be deserialized and aligned into, for example, 5-bit code-groups. The 5-bit code-groups may be decoded into 4-bit data nibbles. The start-of-stream delimiter may be replaced with preamble nibbles and the end of stream delimiter and idle codes may be replaced with a suitable code such as 0x00. The decoded data may then be provided to the MAC. When an invalid code-group is detected in the data stream, a receive error may be indicated to the MAC. The receive error signal also asserts when the link fails or when the descrambler loses lock during packet reception.

In 1000BASE-T mode, the receive data stream may pass through a Viterbi decoder and descrambler, for example, and be translated back into byte wide data. The start of stream delimiter is replaced with preamble bytes and the end of stream delimiter and idle codes may be replaced with a suitable code such as 0x00. Carrier extend codes may be replaced with a suitable code such as 0x0F or 0x1F. The decoded data may then be provided to the MAC. When an invalid code-group is detected in the data stream, the integrated dual port gigabit Ethernet controller chip may provide an error condition to the MAC. The integrated dual port gigabit Ethernet controller chip may also indicate a receive error when receiving carrier extend code-groups, or when the local receiver status becomes unreliable during packet reception.

Packet data in the received data path of the first Ethernet controller 602 may be received by the Rx CPU 622 for advanced processing. After the Rx CPU 622 has completed advanced processing of the packet data, the Rx CPU 622 may place the processed packet data back in the data path for normal processing and DMA activity between a host and the integrated dual port gigabit Ethernet controller chip. In this regard, received data from the first network connection may be received by the Ethernet transceiver or PHY 616 and processed by the MAC controller 618. The processed data may be buffered in at least a portion of the memory 636, from which it may be transferred to the Rx CPU 622 for advanced packet processing.

Similarly, packet data in the send data path of the first Ethernet controller 602 may be transferred to the Tx CPU 624 for advanced processing. After the Tx CPU 624 has completed advanced processing of the packet data for transmission, the Tx CPU 624 may place the processed packet data back in the data path for normal processing and DMA activity between a host and the integrated dual port gigabit Ethernet controller chip. In this regard, data to be transmitted may be buffered in a portion of the memory 636, from which it may be transferred to the Tx CPU 624 for advanced processing. Data processed by the TX CPU 624 may be buffered in at least a portion of the memory 636 from which it may be transferred to the MAC controller 618 for processing. The processed data from the MAC controller 618 may be transferred to the Ethernet transceiver 616 for transmission over the first network connection.

Packet data in the received data path of the second Ethernet controller 604 may be received by the Rx CPU 632 for advanced processing. After the Rx CPU 632 has completed advanced processing of the packet data, the Rx CPU 632 may place the processed packet data back in the data path for normal processing and DMA activity between the host 614 and the integrated dual port gigabit Ethernet controller chip 600. In this regard, received data from the second network connection may be received by the Ethernet transceiver or PHY 626 and processed by the MAC controller 628. The processed data may be buffered in at least a portion of the memory 638, from which it may be transferred to the Rx CPU 632 for advanced packet processing. Data received from the second network connection may be received by the Ethernet transceiver or PHY 626 and processed by the MAC controller 628. The processed data may be buffered in at least a portion of the memory 638, from which it may be transferred to the Rx CPU 622 for advanced packet processing. Processing of data received from the first network connection by the first Ethernet controller 602 may be independent of the processing of data received from the second network connection by the second Ethernet controller 604.

Similarly, packet data in the send data path of the second Ethernet controller 604 may be transferred to the Tx CPU 624 for advanced processing. After the Tx CPU 624 has completed advanced processing of the packet data for transmission, the Tx CPU 624 may place the processed packet data back in the data path for normal processing and DMA activity between a host and the integrated dual port gigabit Ethernet controller chip. In this regard, data to be transmitted may be buffered in a portion of the memory 636, from which it may be transferred to the Tx CPU 624 for advanced processing. Data processed by the TX CPU 624 may be buffered in at least a portion of the memory 536 from which it may be transferred to the MAC controller 618 for processing. The processed data from the MAC controller may be transferred to the Ethernet transceiver 616 for transmission over the first network connection. Processing of data received from the first network connection by the first Ethernet controller 602 may be independent of the processing of data received from the second network connection by the second Ethernet controller 604.

In operation the two Ethernet controllers 602, 604 are independently treated and function as two separate ports. For this reason, each of the Ethernet controllers 602, 604 has its own associated register blocks 640, 642 and memories 636, 638 respectively. For illustrative purposes, the first Ethernet controller 602 may be referred to as a first port and the second Ethernet controller 604 may be referred to as a second port. In order to treat these two ports independently and to permit these two ports to share a single bus interface, each port is separately addressable with respect to the bus interface. For illustrative purposes, the bus interface 608 may be regarded as a PCI bus interface. Notwithstanding, to make the ports separately addressable, each port may be assigned a separate and unique function identifier (ID), for example, function zero (0) and function one (1).

In order to access devices through configuration cycles, for example, a combined bus ID and a device ID may be utilized. In his case, however, the combined bus ID and device ID may not suffice to uniquely distinguish the first and the second ports or Ethernet controllers, since the first and the second controllers maintain the same bus ID and device ID. Accordingly, the combined bus ID and device along with the unique PCI function ID may serve to uniquely distinguish the first port and the second port. As a result, each port may be separately identified by using the combined, bus ID, device ID and function ID. In cases where the bus interface is a PCI interface, a PCI bus ID, PCI ID and a PCI function ID may be utilized to address or distinguish each of the ports.

The integrated dual port gigabit Ethernet controller chip utilizes shared memory resources to, for example, reduce cost, pin count and real estate. Since the resources are shared, the arbiter 606 may be configured to arbitrate access to the shared resources. The arbiter may therefore, receive resource access requests, grant access requests, deny access requests and/or arbitrate resource access conflicts. After an access request has been granted or successfully arbitrated for one of the Ethernet controllers 602, 604, the arbiter 606 may acknowledge the access grant or arbitration to the successful Ethernet controller. The arbiter 606 may then facilitate the transfer of information for the successful Ethernet controller to and from the PCI bus interface 608. In accordance with an aspect of the invention, an arbitration algorithm utilized by the arbiter 606 may be static or it may be dynamically configured depending on, for example, operating conditions.

In accordance with an aspect of the invention, the arbiter 606 may be adapted to tag data packets for a particular Ethernet controller function in order to distinguish data packets received from or to be transferred to a particular one of the Ethernet controllers 602, 604. For example, the arbiter 606 may be adapted to add a particular identifier such as unique bit pattern to packets originated from the first Ethernet controller 602. Similarly, the arbiter 606 may be adapted to add a different identifier such as a unique bit pattern to packets originated from the second Ethernet controller 604. In this regard, the arbiter may direct and facilitate transfer of packets from a particular PCI process to a particular PCI function.

U.S. patent application Ser. No. 10/887,515, filed on Jul. 8, 2004, discloses a method and system for addressing a plurality of Ethernet controllers integrated into a single chip which utilizes a single bus interface, and is incorporated herein by reference in its entirety.

Figure 7:
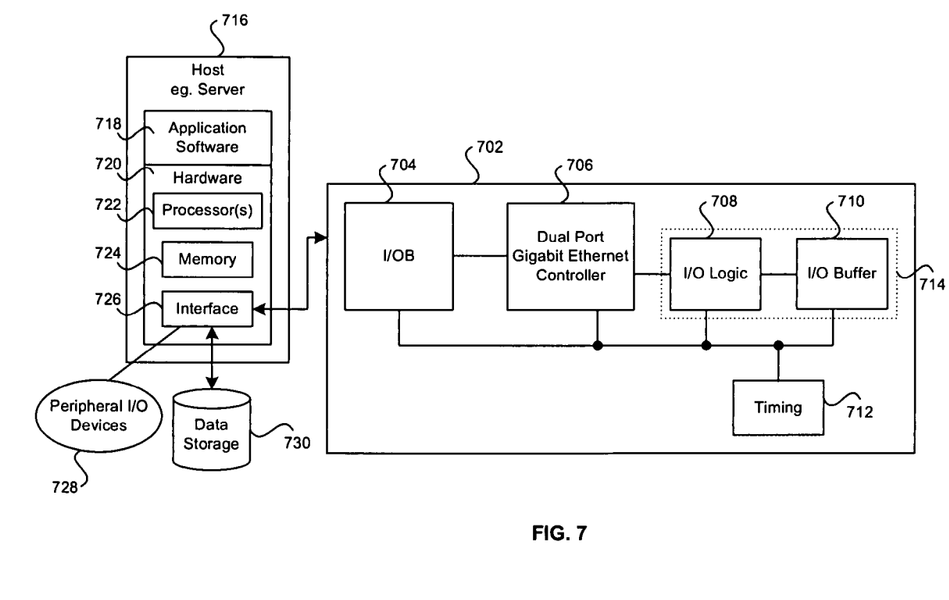
FIG. 7 is a block diagram of an exemplary integrated host PCI I/O bridge (I/OB or IOB) and dual port gigabit Ethernet controller coupled to a host system in accordance with an embodiment of the invention.

FIG. 7 is a block diagram of an exemplary integrated host PCI I/O bridge (I/OB or IOB) and dual port gigabit Ethernet controller coupled to a host system in accordance with an embodiment of the invention. Referring to FIG. 7, there is shown an integrated host PCI I/O bridge and dual port gigabit Ethernet controller 702, a host system 716, a peripheral I/O devices block 728 and a data storage 730. The integrated host PCI I/O bridge and dual port gigabit Ethernet controller 702 is similar to the integrated host PCI I/O bridge and dual port gigabit Ethernet controller 102 of FIG. 1. Accordingly, the integrated host PCI I/O bridge and dual port gigabit Ethernet controller 702 may include an I/O bridge 704, a dual port gigabit Ethernet controller 706, an I/O logic block 708, an I/O buffer block 710 and a timing block 712. The I/O logic block 708 and the I/O buffer block 710 may be integrated into a single functional I/O block 714.

The host system 716 may include a hardware block 720 and an application software block 718. The application software block 718 may also include an operating system block. The hardware block 720 may include a processor block 722, a memory block 724 and an interface block 726. The peripheral I/O devices block 728 and the data storage block 730 may be coupled to the interface block 726. The host system 716 may be a personal computer, a server, a workstation and/or a storage platform.

The PCI/PCIX interface may be adapted to support a plurality of PCI and/or PCIX compliant devices on each of the primary and secondary bus. In accordance with an aspect of the invention, since the PCI/PCIX bus is a shared resource, bus arbiters 242, 244 may be adapted to control access to the PCI/PCIX bus through, for example, a request and grant mechanism, or other arbitration and access scheme. Notwithstanding, the PCI/PCIX bus may be adapted to handle a plurality of different types of transactions. For example, transactions to devices may involve accessing or modifying the configuration registers of the devices or supplying the requested data from the host memory 724 (FIG. 7) to the devices. It may also involve transferring data from devices to the host memory 724. In transactions where data is sent to one or more devices, the address and the data my be stored in, for example, write memory buffers by IMB interface 204 (FIG. 2). When the IMB arbiter 243 grants a request, then data may be sent on the bus with the corresponding address.

In some transactions, for example, PCI read transaction, the IMB interface 204 may, in anticipation, prefetch additional data and store the prefetched data in, for example, a local write buffer. In this regard, the intelligent prefetching of data may significantly improve read data access latency, thereby optimizing system performance. In those transactions where devices send data to the host memory, the data and the address may also be stored in the read memory. Accordingly, the PCI controller may be adapted to send a request to the IMB arbiter 243 to send the data to the host memory. The PCI controller is adapted to maintain strict read and write ordering as defined by the PCI/PCIX standard.

In operation the two primary and secondary PCI controllers are independently treated and function as two separate ports. For this reason, each of the PCI controllers has its own associated register blocks and memories, respectively. In order to treat these two primary and secondary PCI controllers independently as separate ports, and to permit these two ports to share a single bus interface, each port is separately addressable with respect to the IMB interface. In this regard, in order to make the ports separately addressable, each port may be assigned a separate and unique function identifier (ID), for example, function zero (0) and function two (2).

In order to access the PCI controllers through configuration cycles, for example, a combined bus ID and a device ID may be utilized. In his case, however, the combined bus ID and device ID may not suffice to uniquely distinguish the first and the second ports, since the first and the second controllers maintain the same bus ID and device ID. Accordingly, the combined bus ID and device along with the unique PCI function ID may serve to uniquely distinguish the first port and the second port. As a result, each port may be separately identified by using the combined, bus ID, device ID and function ID. U.S. application Ser. No. 10/887,515, filed on Jul. 8, 2004, illustrates an exemplary method and system that may be utilized for distinguishing and addressing the PCI controllers as separate ports and is hereby incorporated herein by reference in its entirety.

The integrated dual PCI controller chip utilizes shared memory resources to, for example, reduce cost, pin count and real estate. Since the resources are shared, the arbiter 243 may be configured to arbitrate access to the shared resources. The arbiter 243 may therefore, receive resource access requests, grant access requests, deny access requests and/or arbitrate resource access conflicts. After an access request has been granted or successfully arbitrated for one of the PCI controllers, the arbiter 243 may acknowledge the access grant or arbitration to the successful PCI controller. The arbiter 243 may then facilitate the transfer of information for the successful PCI controller to and from the intermodule bus (IMB) interface 224. In accordance with an aspect of the invention, an arbitration algorithm utilized by the arbiter 224 may be static or it may be dynamically configured depending on, for example, operating conditions.

In general, the integrated host PCI I/O bridge and dual port gigabit Ethernet controller 702 may provide a solution for transporting high speed data in and out of servers and to and from external I/O, main system memory and processors. This may be utilized to facilitate broadband communication and networking of voice, video and data. In this regard, the I/OB with integrated Ethernet controllers 702 standardizes gigabit Ethernet as the primary connection in servers and workstations.

In one embodiment of the invention, the host PCI I/O bridge and dual port gigabit Ethernet controller 702 may operate with standard twisted pair wiring at 10, 100 or 1000 Megabits/second. Notwithstanding, in an alternate embodiment of the invention, the integrated host PCI I/O bridge and dual port gigabit Ethernet controller 702 may be adapted to support differential signaling to an external serialized/deserialized (SERDES) interface for optical applications.

In light of the foregoing, aspects of the invention provide an integrated I/OB with dual integrated gigabit Ethernet controllers 702, each capable of full-duplex operation at speeds up to one Gigabit/second, along with a PCI-X bus controller. This is a tightly integrated solution, which provides features such as improved system performance and reduced system cost. The integrated I/OB with dual integrated gigabit Ethernet controllers 702 eliminates the need for discrete GbE interfaces, which reduces system board real estate requirements, and facilitates the use of GbE in space-constrained server applications, for example. Server applications may include pedestal, blade and rack-mounted servers.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
   an inter-module bus interface;
   an I/O bridge integrated within a single chip that is configured to control transfer of data across the inter-module bus interface;
   a first bus controller integrated within the I/O bridge, wherein the I/O bridge is further configured to manage at least the inter-module bus interface via at least the first bus controller;
   a second bus controller integrated within the I/O bridge, wherein the I/O bridge is further configured to manage an Ethernet interface via at least the second bus controller; and
   a multiport Ethernet controller integrated within the single chip, wherein ports of the multiport Ethernet controller are assigned individual function identifiers.

2. The system of claim 1, wherein the Ethernet interface is configured to independently process at least a first Ethernet network connection and a second Ethernet network connection.

3. The system of claim 1, wherein the first bus controller comprises a primary PCI bus controller.

4. The system of claim 3, wherein the second bus controller comprises a secondary PCI bus controller.

5. The system of claim 1, the integrated multiport Ethernet controller further comprising:
   at least two Ethernet controllers; and
   a common arbiter, wherein:
   the at least two Ethernet controllers share the common arbiter;
   the common arbiter is coupled to a single bus interface, wherein
   the single bus interface is further coupled to the I/O bridge; and
   the common arbiter controls access to the single bus interface by the at least two Ethernet controllers.

6. The system of claim 5, wherein the single bus interface comprises one selected from a group consisting of a PCI interface and a PCI-X interface.

7. The system of claim 1, wherein the I/O bridge is coupled to a host system.

8. The system of claim 5, further comprising:
   a timing function module integrated within the single chip, wherein the timing function module is coupled to at least one of the I/O bridge, the at least two Ethernet controllers, or an I/O function module.

9. The system of claim 5, wherein each of the Ethernet controllers has its own associated register blocks and memories.

10. The system of claim 1, wherein the function identifier comprises a combination of a bus ID, device ID, and function ID.

* * * * *